United States Patent [19]
Holtman et al.

[11] Patent Number: 5,368,347
[45] Date of Patent: Nov. 29, 1994

[54] SWELL LATCH ASSEMBLY

[75] Inventors: Eli J. Holtman, King of Prussia; Edward A. McCormack, Media; Jarl Mork, West Chester, all of Pa.

[73] Assignee: Southco, Inc., Concordville, Pa.

[21] Appl. No.: 88,263

[22] Filed: Jul. 7, 1993

[51] Int. Cl.$^5$ ............................................. B65D 45/30
[52] U.S. Cl. ........................................ 292/257; 292/1
[58] Field of Search ............... 292/113, 257, 258, 247, 292/288, 1, 56, 115

[56] References Cited

U.S. PATENT DOCUMENTS

| | | | |
|---|---|---|---|
| 1,931,850 | 10/1933 | Moore | 292/113 |
| 2,094,779 | 10/1937 | Donaldson | 292/257 X |
| 2,319,504 | 5/1943 | Holman | 292/256 X |
| 4,540,206 | 9/1985 | Frame et al. | 292/DIG. 49 X |
| 4,729,584 | 3/1988 | Beckerer, Jr. | 292/257 |
| 5,127,684 | 7/1992 | Klotz et al. | 292/113 |

FOREIGN PATENT DOCUMENTS

480534A1  4/1992  European Pat. Off. .

OTHER PUBLICATIONS

Southco Fasteners Handbook 40 (Southco, Inc., Pennsylvania 1990) Swell Latches, pp. J-2 and J-3.
Southco Fasteners Handbook 40 (Southco, Inc. Pennsylvania 1990) Fractional-Turn Fastener, p. J-12.

*Primary Examiner*—Rodney M. Lindsey
*Attorney, Agent, or Firm*—Paul and Paul

[57] ABSTRACT

A swell latch assembly is mounted in an aperture formed in a first member for releasably retaining the first member against a corresponding second member and in a latched position. The swell latch assembly includes a handle which is adapted for pivotal rotation. A shaft is included comprising a unitary member which is connected with the handle. The handle is adapted to facilitate axial movement of the shaft as the handle is pivotally rotated between open and closed positions. A bushing is provided on the shaft which is adapted for axial movement corresponding with movement of the shaft. The bushing is adapted to releasably retain the second member in engagement with the first member when the handle is in its closed position. A retaining member is also included in connection with the shaft which is adapted for securing the bushing in its mounted position on the shaft.

39 Claims, 4 Drawing Sheets

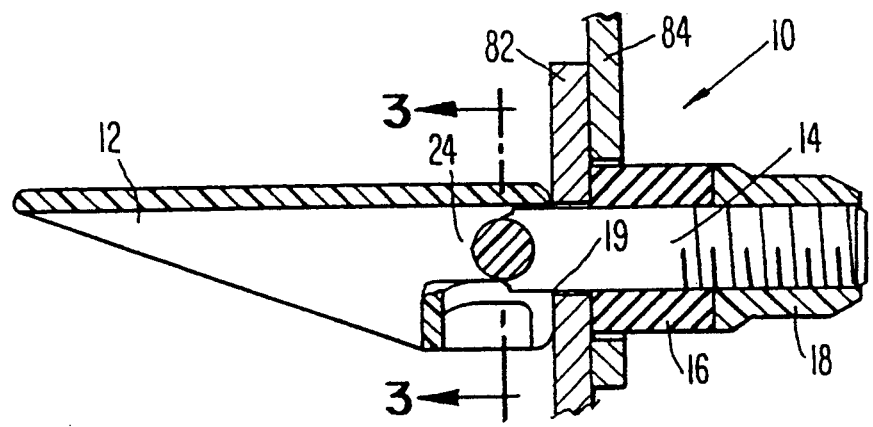
*Fig. 1*
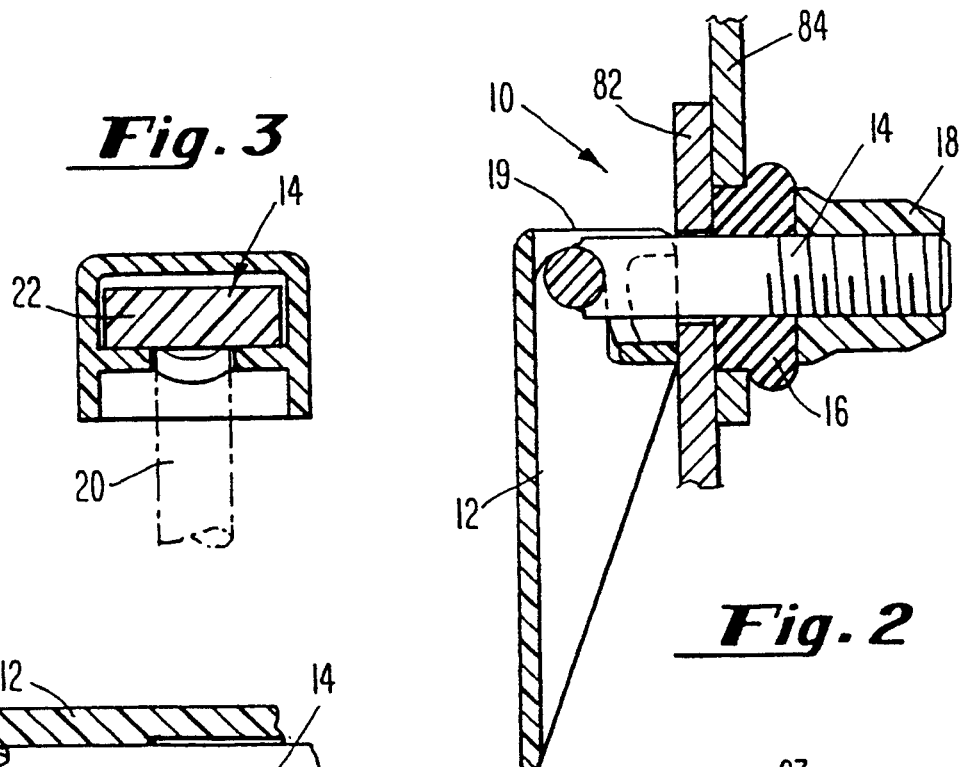
*Fig. 3*
*Fig. 2*
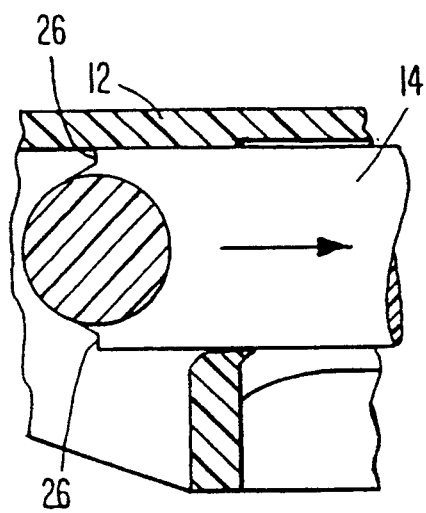
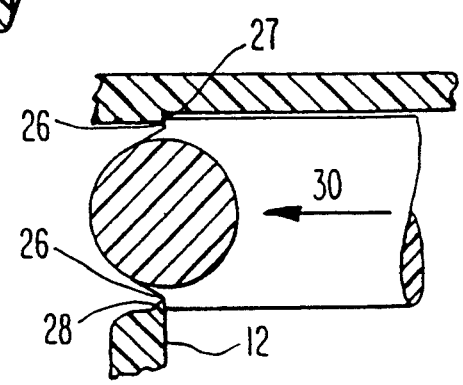
*Fig. 4*
*Fig. 5*

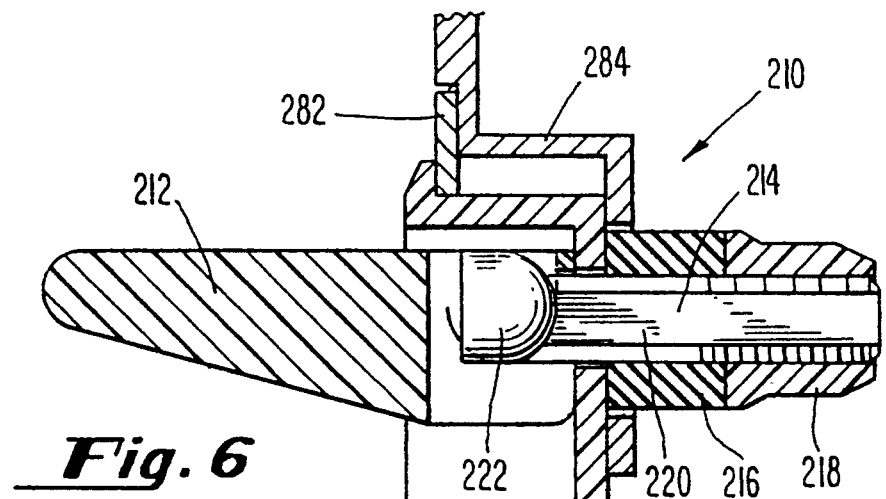
*Fig. 6*
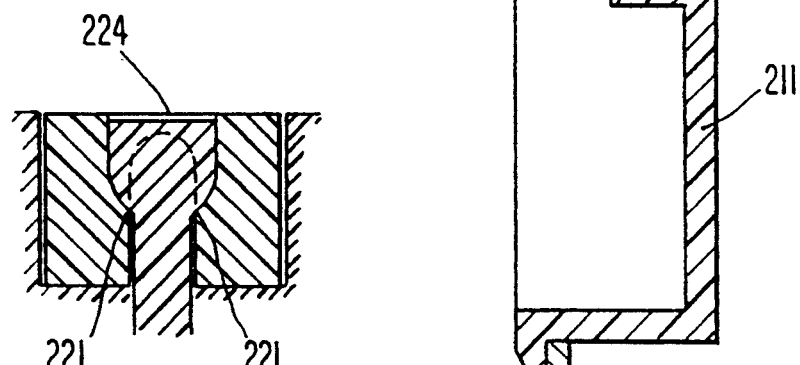
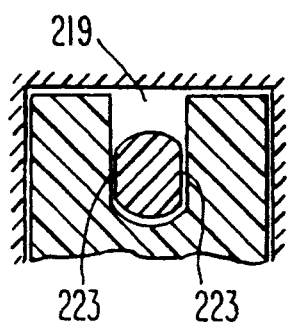
*Fig. 8*
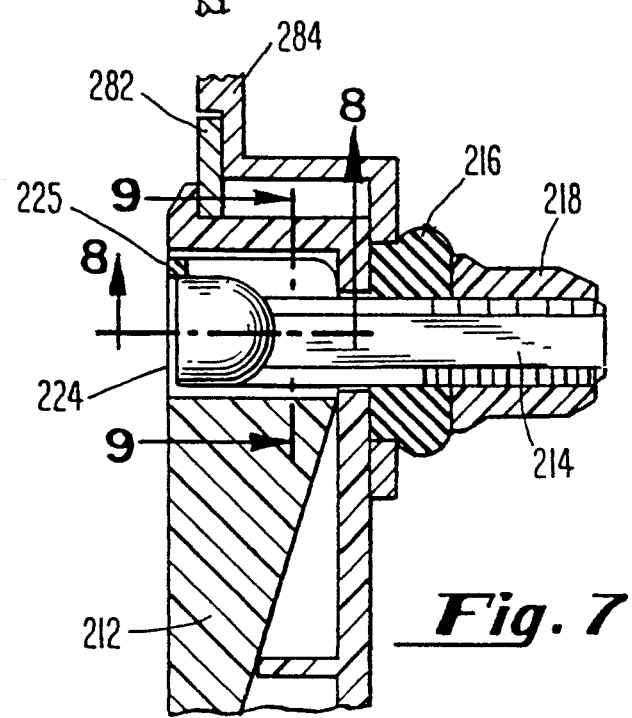
*Fig. 9*
*Fig. 7*

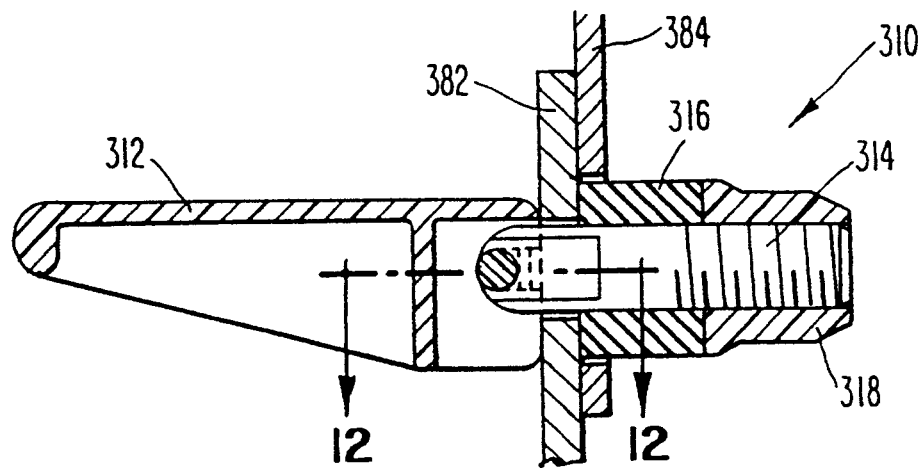
*Fig. 10*
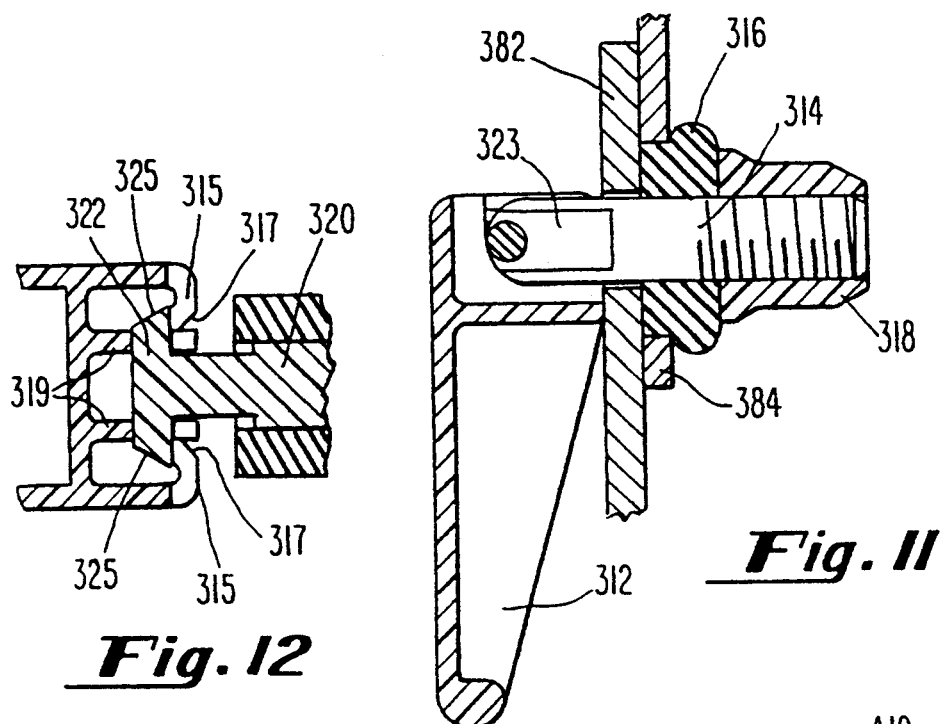
*Fig. 12*  *Fig. 11*
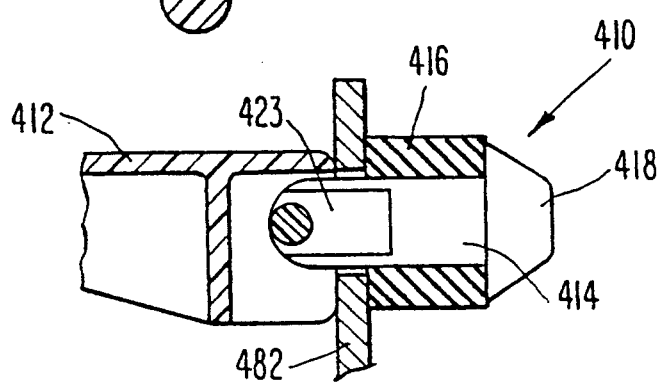
*Fig. 13*

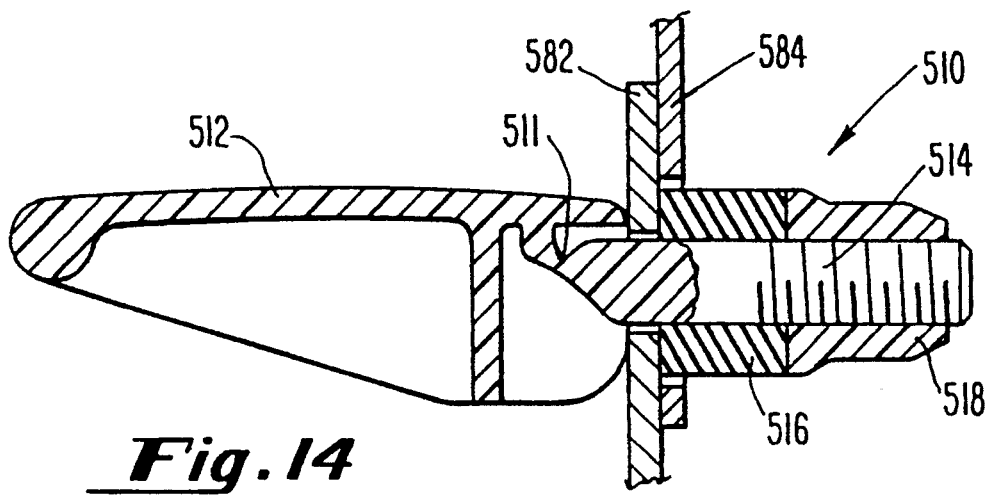
_Fig. 14_
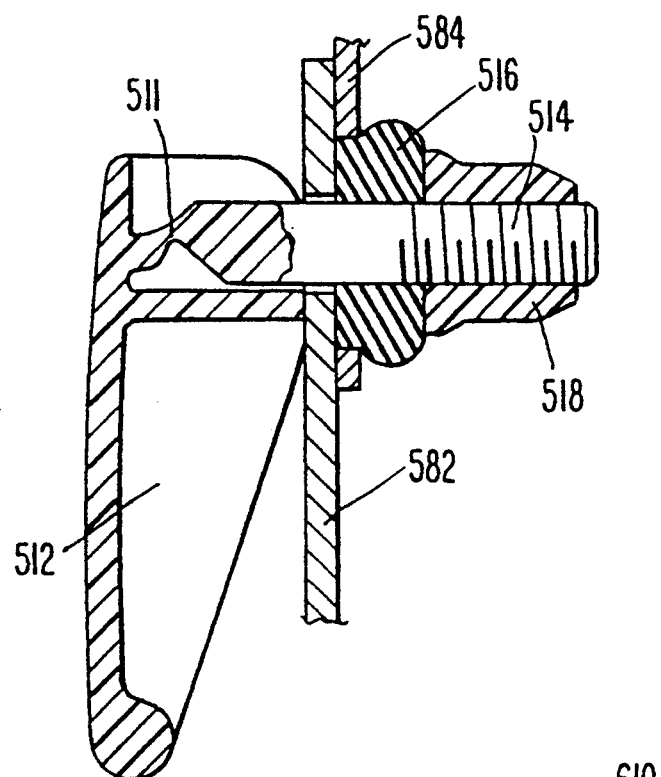
_Fig. 15_
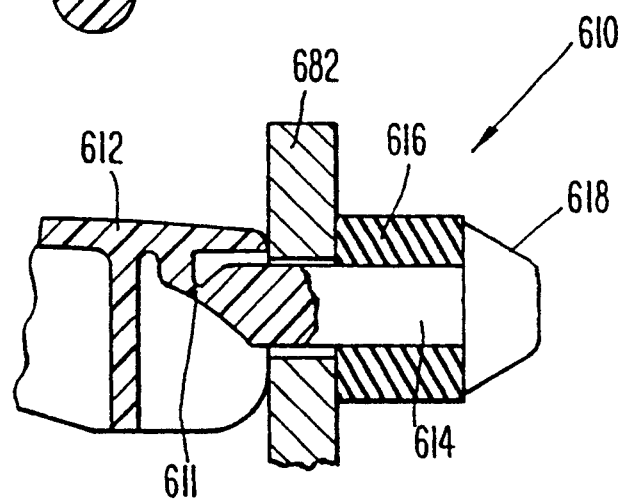
_Fig. 16_

SWELL LATCH ASSEMBLY

BACKGROUND OF THE INVENTION

1. Field of the Invention

The present invention relates generally to latching devices and more particularly to swell latch assemblies adapted for fastening hinged doors, panels and the like.

2. Brief Description of the Prior Art

Presently, there are a number of swell latch assemblies known in the art which are operable for securing two panels or a panel against a corresponding frame. Generally, latches of this type are mounted proximate the edges of the first panel and on engagement are adapted to compress the first panel against the corresponding second panel or frame and into a latched position. In such devices, a handle is provided pivotally connected by a pin to a shaft which is inserted through an aperture in the panel member. In instances where flush mounting of the latch is desired, the handle is also connected to a housing which is then installed within the aperture in the panel member. A rubber bushing is also provided mounted on the shaft and secured by a nut. The nut is receivable onto a threaded section of the shaft for securing the bushing in the mounted position. In operation, the rubber bushing when unlatched can be passed through a configured hole formed in the corresponding panel or frame. On latching, pivotal movement of the handle from an opened to a closed position corresponds with axial movement of the shaft. This axial movement of the shaft works to compress and deform or "swell" the rubber bushing so as to engage an inner surface of the corresponding panel member or frame and into the latched position. This type of latch had been used originally for sealing of thermos bottles. A riveted on washer insted of a nut secured the bushing.

However, one problem which has been observed is that manufacture of such prior art latches involves a relatively long and costly procedure. In particular, five separate components are required for assembly of such devices. Furthermore, the procedure of installing the pivot pin in order for connecting the handle to the shaft and housing further increases the time required for manufacture.

Because of these and other difficulties associated with swell latch assemblies presently employed, there now exists a need for a simple and economical swell latch assembly.

SUMMARY OF THE INVENTION

The present invention provides a swell latch assembly which is adapted for being mounted in an aperture formed in a first member for releasably retaining the first member against a corresponding second member and in a latched position. The second member includes an outer and an inner surface and an aperture therethrough which is adapted for receiving the swell latch assembly as the first member and a second member are being latched together. The first member includes an outer and an inner surface, with the inner surface being adapted to engage the outer surface of the second member as the first and the second members are being latched together. The swell latch assembly is adapted to engage the inner surface of the second member proximate the aperture thereof in order for releasably retaining the first member against the second member and in the latched position. For this purpose, the swell latch assembly according to the present invention includes a handle means which is adapted for pivotal rotation. A shaft means is also included which comprises a unitary member and which is associated with the handle means. The handle means is adapted to facilitate axial movement of the shaft means as the handle means is pivotally rotated between open and closed positions. A bushing means is also included which is associated with the shaft means. The bushing means is adapted for axial movement corresponding with movement of the shaft means. The bushing means releasably retains the second member in engagement with the first member when the handle means is in the closed position. A retaining means is also provided associated with the shaft means which is adapted for securing the bushing means in association with the shaft means.

In accordance with the present invention, an object is to provide a swell latch assembly in which the parts are few and which provides a simple installation process.

It is another object of the present invention to provide a swell latch assembly which is inexpensive to construct and sufficiently simple in design and operation.

These and other objects of the present invention will become more readily apparent when taken into consideration with the following description and the attached drawings.

BRIEF DESCRIPTION OF THE DRAWINGS

FIG. 1 is a sectional elevational view of a swell latch assembly according to a first preferred embodiment of the present invention, the swell latch assembly shown in an unlatched position.

FIG. 2 is a sectional elevational view of the swell latch assembly of FIG. 1 shown in a latched position.

FIG. 3 is a sectional plan view of the swell latch assembly of FIG. 1 taken along the line 3—3.

FIG. 4 is an enlarged sectional elevational view of the swell latch assembly of FIG. 1 showing installation of a shaft member.

FIG. 5 is an enlarged sectional elevational view of the swell latch assembly of FIG. 4 showing containment of the shaft member within the device.

FIG. 6 is a sectional elevational view of a swell latch assembly according to a second preferred embodiment of the present invention, the swell latch assembly shown in an unlatched position.

FIG. 7 is a sectional elevational view of the swell latch assembly of FIG. 6 shown in a latched position.

FIG. 8 is a sectional rear elevational view of the swell latch assembly of FIG. 7 taken along the line 8—8.

FIG. 9 is a sectional plan view of the swell latch assembly of FIG. 7 taken along the line 9—9.

FIG. 10 is a sectional elevational view of a swell latch assembly according to a third preferred embodiment of the present invention, the swell latch assembly shown in an unlatched position.

FIG. 11 is a sectional elevational view of a swell latch assembly of FIG. 10 shown in a latched position.

FIG. 12 is a sectional front elevational view of the swell latch assembly of FIG. 10 taken along the line 12—12.

FIG. 13 is a sectional elevational view of a swell latch assembly according to a fourth embodiment of the present invention.

FIG. 14 is a sectional elevational view of a swell latch assembly according to a fifth embodiment of the present invention, the swell latch assembly shown in an unlatched position.

FIG. 15 is a sectional elevational view of the swell latch assembly of FIG. 14 shown in a latched position.

FIG. 16 is a sectional elevational view of a swell latch assembly according to a sixth embodiment of the present invention.

DETAILED DESCRIPTION OF THE PREFERRED EMBODIMENTS

Referring now to the drawings in detail, wherein like reference numerals indicate like elements throughout the several views, there is shown in FIG. 1 a swell latch assembly according to a first preferred embodiment of the present invention. The swell latch assembly 10 as illustrated in FIG. 1 is in an unlatched position and mounted in an aperture formed through a section of a first member 82. The first member 82 as shown is in engagement with a section of a second panel member 84. The first panel member 82 according to the present invention can comprise a door, panel or the like which is adapted to engage the second panel member 84 in a closed position in order for enclosing various equipment which may be installed therein (not shown). The second member 84 of the present invention can comprise a corresponding panel or a frame structure depending on the application of the swell latch assembly 10. The composition of the first and second members 82 and 84 can be manufactured from any suitable type of material which will provide a rigid support structure, such as wood, plastic or sheet metal. As illustrated in FIGS. 1 through 5, the major components of the swell latch assembly 10 of the present invention are a handle means 12, a shaft means 14, a latching means comprising a bushing means 16 and a retaining means 18. The handle means 12, as illustrated, is pivotally connected to the shaft means 14. As best illustrated in FIG. 3, the shaft means 14 comprises a one-pie, integral member preferably comprised of thermoplastic, however other suitable materials can also be used. The shaft means 14 as shown comprises a substantially T-shaped member which defines a generally elongated first portion 20 substantially perpendicular to a generally elongated second portion 22. The first portion 20 extends through a slot 19 formed in the front of the handle means 12, proximate the first member 82. The second portion 22 as shown preferably is received within the handle means 12 with its two end portions being adjacent an inner surface of the handle means 12 on installation, however such is not required. The handle means 12 as disclosed is preferably manufactured of plastic, however other materials can also be utilized for this same purpose. As best illustrated in FIGS. 4 and 5, the shaft means 14 further includes at least one shoulder means thereon, preferably the pair of shoulder means 26 are provided. The shoulder means 26 as shown is adapted to engage at least one generally ramped, flexible protruding member 28 and step 27 provided in the handle means 12 as will be described in detail below. Furthermore, as shown in FIGS. 1 and 2, the shaft means 14 is included with a threaded portion thereon adapted for receiving the retaining means 18. The retaining means 18 preferably comprises a nut or similar member or the like capable of being mounted on the threaded shaft means 14 for retaining the position of the bushing means 16. The bushing means 16 as shown comprises a cylindrical member, preferably manufactured of rubber or other suitable elastic material.

As best illustrated in FIGS. 1, 3 and 4, on installation, the shaft means 14 is received from the rear of the handle means 12, with the first portion 19 in front, through an opening 24 formed in the handle means 12 in order for pivotally connecting the shaft means 14 and the handle means 12 in the position illustrated in FIG. 3. Upon installation, the flexible, protruding member 28 of the handle means 12 is flexed forwardly by the outer surface of the shaft means 14 as shown in FIG. 4. After the shaft means 14 passes over the flexible protruding member 28, the flexible protruding member 28 flexes back to its original ramped position. In this configuration, the flexible protruding member 28 and step 27 as shown in FIG. 5 are adapted to retain the shaft means 14 within the handle means 12 by contacting the shoulder means 26 whenever the shaft means 14 is moved in the direction of arrow 30.

Following installation as described above, the shaft means 14 is inserted through the aperture in the first member 82 as shown in FIG. 1. In this position, the bushing means 16 is then mounted on the shaft means 14 and secured by the retaining means 18. Retaining means 18 is adjustable on the threaded portion of the shaft means 14 so as to position both the bushing means 16 in contact with an inner surface of the first member 82 and the handle means in contact with an outer surface of the first member 82.

In operation, the first member 82 is brought into contact with the second member 84 for closing the two members. As shown in FIG. 1, the second member 84 is provided with an aperture therethrough in order to allow passage of the bushing means 16 therethrough as the first and second members 82 and 84 are closed together. After which, the handle means 12 is pivotally rotated about the shaft means 14, as it is passed through the slot 19 therein, from an opened position illustrated in FIG. 1, to a closed position shown in FIG. 2. The pivotal rotation of the handle means 12 from the opened to the closed position corresponds with axial movement outwardly of the shaft means 14 in the direction of the first member 82. The axial movement of the shaft means 14 causes the bushing means 16 captured between the panel member 82 and retaining means 18 to compress along its axis and swell in its diameter which works to secure the second panel member 84 in its closed position shown in FIG. 2.

In FIGS. 6 though 8 is illustrated a second embodiment of the swell latch assembly according to the present invention. In this second embodiment, portions identical to that identified in relation to the first embodiment are designated with a corresponding number beginning with the number 200. As illustrated, the swell latch assembly 210, similar to that described above, includes a handle means 212, shaft means 214, bushing means 216 and retaining means 218. In addition, a housing means 211 is also shown. The shaft means 214 as described in this second embodiment comprises a generally elongated first portion 220 in connection with a substantially hemispherical second portion 222. The shaft means 214 as shown is receivable on installation through an aperture 224 formed through the housing means 212. When installed, the substantially hemispherical second portion 222 of the shaft means 214 is in engagement with at least one seating member provided in the handle means 212, preferably the two seating members 221 as shown are provided. In the present embodiment, the substantially hemispherical second portion 222 is positioned offset on the substantially elongated first portion 220 toward the front of the housing means 212 when installed.

Similar to that described above, the swell latch assembly 210 is provided within the panel member 282 and latched into the position illustrated in FIG. 7. In this embodiment, the housing means 211 is provided which is shown mounted in the panel member 282. The housing means 211 as shown includes flange means adapted for engaging the panel member 282, an aperture therethrough for receiving the shaft means 214, and an opening therein defining a cavity adapted for receiving the handle means 212. As shown in FIG. 7, the handle means 212 when in its closed position is adapted to have its outer surface contiguous with an outer surface of the flange means, thus providing a flush mounting of the device. A bracket or other member can also be included for retaining the position of the housing means 211 within the panel member 282.

During operation, the pivotal rotation of the handle means 212 is guided by a slot 219 provided within the front portion thereof proximate the panel member 282 and is limited by the bridge 225 disposed thereon. The offset position of the substantially hemispherical second portion 222 permits the handle means 212 to pivot through an extended range prior to contacting the bridge 225. In the present embodiment, the handle means 212 is adapted to pivot through approximately 80° before the shaft means 214 will engage the bridge 225 thereon, however other amounts of rotation can also be provided. Furthermore, the offset configuration of the substantially hemispherical second portion 222 of the shaft means 214 operates to maintain the axial position of the shaft means 214 relative to the handle means 212 during operation.

In FIGS. 10 through 12 is shown a third embodiment of the present invention. In this embodiment, portions corresponding with the earlier two embodiments are designated by the number 300. In this embodiment. The latch assembly 310 includes a handle means 312, a shaft means 314, a bushing means 316 and a retaining means 318. In this embodiment, the shaft means 314 is adapted to be snap-fit within the handle means 312 for installation thereof. The shaft means 314, similar to that described in relation to the first embodiment, comprises a substantially T-shaped member defining a generally elongated first portion 320 substantially perpendicular to a generally elongated second portion 322. Preferably, the shaft means 314 is manufactured of thermoplastic, however other suitable materials can also be used. The generally elongated second portion 322 is included with chamfer means thereon comprising at least one beveled edge on an end thereof for engaging the handle means 312, preferably each of the two ends of the second portion 322 are formed having a beveled edge 325 disposed thereon. On installation, the beveled edges 325 of the second portion 322 are adapted to engage cantilever means provided in the handle means 312. The cantilever means of the present embodiment comprises at least one but preferably two flexible cantilevered gates 315. with each having a beveled edge 317 thereon adapted for receiving the beveled edges 325 of the generally elongated second portion 322. On installation, the cantilever gates 315 are flexed backwards by the beveled edges 325. Once installed, the gates 315 flex back to their original position for retaining the generally elongated second portion 322 of the shaft means 314 therein. The handle means 312 is further provided with a pair of bearing seats 319 provided therein which are adapted to support the generally elongated second portion 322 during operation of the device shown in FIG. 12.

In FIG. 13 is shown a fourth embodiment of the swell latch assembly according to the present invention. In this embodiment, the portions corresponding with the earlier embodiments are designated with the number 400. This present embodiment is identical to that described in relation to the third embodiment of the present invention above, however the shaft means 414 and retaining means 418 as described in the third embodiment are substituted by an integral one-piece cone-nosed retaining means 418/shaft means 414. In this embodiment, the bushing means 416 prior to assembly is installed on the shaft means 414 by forcing it over either the generally elongated second portion 422 or cone-nosed portion thereof. During installation, the integral retaining means 418/shaft means 414 is inserted from the inner side of the panel member 482 through the aperture thereof, after which the handle means 412 is forced against the second portion 422 of the shaft means 414 for installation. In this embodiment, the aperture through panel member 482 is preferably configured including a substantially circular portion to accommodate the cone-nosed portion and two adjoining smaller substantially rectangular portions to allow passage of the two ends of the second portion of the shaft means (not shown).

In FIGS. 14 and 15 is illustrated a Fifth embodiment of the present invention. As described in this embodiment, the portions corresponding to the earlier embodiments are designated with a number 500. In this embodiment, the swell latch assembly 510 comprises three components, including an integral, one-piece handle means 512/shaft means 514, a bushing means 516 and a retaining means 518. The shaft means 514 as illustrated is cut or otherwise formed in connection with and extending from the handle means 512 which provides a living hinge. The living hinge allows the handle means 512 to pivot about a hinge means 511 relative to the shaft means 514. Preferably, the integral handle means 512/shaft means 514 is manufactured of polypropylene, although other suitable materials can also be used for this purpose. Upon installation of the swell latch assembly 510, the integral handle means 512/shaft means 514 combination is inserted through the aperture in the panel 582, afterwhich the bushing means 516 and retaining means 518 are mounted from the inner side thereof, similar to that described in relation to the first two embodiments of the present invention.

In FIG. 16 is shown a sixth embodiment of the swell latch assembly according to the present invention. In this embodiment, the portions which axle identical to that described above are designated with the number 600. The swell latch assembly 610 of the present embodiment is identical to that described above in relation to the Fifth embodiment, except that two components are provided rather than the three disclosed in relation to the swell latch assembly 510. In particular, the latch assembly 610 as disclosed comprises an integral one-piece cone-nosed retaining member 618/shaft means 614/handle means 612 combination and a bushing means 616. The configuration of the cone-nosed retaining means 618 portion is similar to that described in relation to the fourth embodiment of the present invention previously described. In this embodiment, the bushing means 616 is forced over the cone-nosed retaining member 618 prior to installation.

In order to accommodate installation of the swell latch assembly 610, a keyhole shaped aperture is provided formed in the panel member 682 (not shown). In particular, the cone-nosed retaining means 618 is inserted through the larger diameter of the key hole aperture and thereafter slid into the smaller portion for accommodating installation thereof.

The swell latch assembly of the present invention possesses several advantages over conventional swell latch assemblies. A particular advantage is that the present invention provides an integral one-piece shaft-/pivot pin combination which facilitates a quicker and less expensive assembly process since fewer parts are required. In addition, the integral one-piece shaft means of the present invention provides for simple slip-fit installation within the latch structure. In particular, the shaft means 14 described in relation to the first embodiment is received through the aperture 24 formed in the handle 12 for installation, the shaft means 214 disclosed in relation to the second embodiment is received through the aperture 224 formed in the handle means 212, the handle means 314 and 414 described in relation to the third and fourth embodiments, respectively, are adapted to be snap-fit within the handle means thereof and the shaft means 514 and 614 described in relation to the fifth and sixth embodiments of the present invention, respectively, is integrally provided connected directly to the handle means of the device. Rather, in prior art devices, manual installation of the required pivot pin member provides for a rather tedious and time consuming process in many instances. In addition, the structure of the shaft means 14 disclosed in relation to the first embodiment of the present invention further facilitates a quicker assembly of the device. In particular, as illustrated in FIGS. 1 and 4, due to the two shoulder means 26, the shaft means 14 is bilaterally symmetrical about a plane defined by a central axis of rotation extending through both the generally elongated first and second portions 20 and 22, respectively. As such, the shaft means 14 can be installed within the handle 12 in either of two possible orientations. This operates to "fool-proof" manual assembly of the device and also simplifies automated assembly should such be utilized therefor.

In addition, the present invention provides another advantage over the prior art in that the shoulder means 26 of the shaft means 14 and flexible protruding member 28 and step 27 of the handle means 12, as disclosed in the first embodiment of the present invention, operates to retain the shaft means within the handle means, once, installed, during shipment of the device. In particular, the swell latch as disclosed in the first embodiment may be partially assembled prior to shipment. Specifically, in these instances, the bushing means 16 and retaining means 18 are later assembled to the shaft means 14 and handle means 12 following installation within the panel member 82. In this regard, the swell latch assembly 10 incorporates the flexible protruding member 28 and step 27 which operate as an interference by engaging the shoulder means 26 during movement of the shaft means 14 to prevent possible disassembly of the device.

Further, the shaft means 314 and 315 disclosed in relation to the third and fourth embodiments, respectively, are inserted through the aperture from the inner side of the first member and the handle means is then snap-fit against the shaft means for installation. This provides for a quicker assembly as the shaft means engages the front face of the handle means for installation of the device.

Another advantage of the present invention over prior art devices is that the integral cone-nosed retaining means incorporates an angle at the base thereof which operates to prevent the bushing means from possibly riding up and over the retaining means under a latching load when in a latched position.

It will be recognized by those skilled in the art that changes may be made by the above-described embodiments of the invention without departing from the broad inventive concepts thereof. For example, the housing means 211 which is disclosed in the second embodiment can also be utilized with the other embodiments of this invention whenever flush mounting of the latch is desired. Furthermore, as to the sixth embodiment of the present invention, a corresponding keyhole shaped aperture would be provided through the housing means when adapted for flush mounting. In addition, as to the second, third and fourth embodiments of the present invention, the shaft means disclosed therein can also be formed having at least one, or a pair of flat portions 223, 323 and 423, respectively, within the generally elongated first portions thereof, as shown in FIGS. 9, 11 and 13, for maintaining the axial position of the shaft means relative to the handle means. Further, the several different shaft means designs which are disclosed can also have application with other types of latches as well, such as pawl latches. It is understood, therefore, that this invention is not limited to the particular embodiments disclosed, but it is intended to cover all modifications which are within the scope and spirit of the invention as defined by the appended claims.

We claim:

1. A swell latch assembly for mounting in an aperture formed in a first member adapted for releasably retaining the first member against a corresponding second member and in a latched position, the second member including an outer and an inner surface and an aperture therethrough adapted for receiving the swell latch assembly as the first member and the second member are being latched together, the first member including an outer and an inner surface, with the inner surface of the first member engaging the outer surface of the second member as the first and the second members are being latched together, the swell latch assembly engaging the inner surface of the second member proximate the aperture thereof for releasably retaining the first member against the second member and in the latched position, the swell latch assembly comprising:

a handle member adapted for pivotal rotation;

a shaft comprising a unitary member pivotally engaging the handle member, wherein the pivotal engagement of the shaft and handle member is independent of a pivot pin member adapted for providing an integrated connection therebetween the shaft being adapted to extend through the aperture in the first member when the swell latch assembly is mounted therein, with the handle member being adapted to facilitate axial movement of the shaft relative to the first member as the handle member is pivotally rotated by the pivotal engagement with the shaft between opened and closed positions, wherein the shaft when the swell latch assembly is in the latched position is under a tensile load adapted for retaining the first and second members together;

a retaining member associated in connection with the shaft adapted for movement axially corresponding with the axial movements of the shaft;

a bushing member associated with the shaft and provided between the retaining member nd the first member when the swell latch assembly is mounted therein, wherein as the first and second members are being latched together, the bushing member is adapted for being temporarily deformed by the axial movement of the retaining member when the handle member is pivoted to its closed position, whereby the bushing member engages the inner surface of the second member for releasably retaining the first and second members when in the latched position; and wherein the handle member includes a front end, a back end and a pair of side walls adapted for connection thereof and the shaft comprises a generally elongated first portion substantially perpendicular to a second portion, with the second portion providing the pivotal engagement with the handle member, wherein the second portion of the shaft includes a first end and a second end, with the first end being positioned proximate the first side wall and the second end being positioned proximate the second side wall when received therein, whereby the pivotal engagement of the handle member and the second portion of the shaft is independent of the first and second ends thereof.

2. A swell latch assembly according to claim 1, wherein the shaft as the handle member is pivotally rotated between its opened and closed positions is in engagement with the handle member although not fixedly connected thereto.

3. A swell latch assembly according to claim 1, wherein the shaft and handle member further include containment means disposed therebetween adapted for retaining the shaft within the handle member upon installation for preventing possible disassembly thereof, wherein the containment means comprises first and second shoulder members disposed on the shaft adapted for engaging a flexible tab member and a substantially stepped section provided disposed within the handle member, wherein the shaft is adapted to flex the flexible tab member forwards as the shaft is being installed in a first direction within the handle member, with the flexible tab member springing backward to its original position when the shaft is received within the handle member, whereby when the shaft is installed, the shaft is not fixedly connected within the handle member, wherein the flexible tab member is adapted to engage the first shoulder member and the substantially stepped section is adapted to engage the second shoulder member in response to predetermined movement of the shaft in a second direction within the handle member for preventing possible disassembly of the shaft and the handle member when installed.

4. A swell latch assembly according to claim 3, wherein the shaft comprises a substantially T-shaped member defining a generally elongated first portion substantially perpendicular to a generally elongated second portion, with the shaft being bilaterally symmetrical about a plane defined by a central axis of rotation of both the generally elongated first and second portions thereof, whereby the shaft is receivable within the handle member in two positions defined by the bilaterally symmetrical portions thereof, wherein the first and second shoulder members are positioned generally diametrically opposing on the shaft, with the flexible tab member and the substantially stepped section of the handle member being provided corresponding to the position of the first and second shaft shoulder members.

5. A swell latch assembly according to claim 1, wherein the handle member includes an aperture extending therethrough from a first side through a second side and defining n inner surface therebetween adapted for receiving the shaft on installation, with the second portion of the shaft being adapted for engaging the inner surface of the handle member for both providing the pivotal engagement thereof and for retaining the shaft on installation, wherein as the handle member is pivotally rotated between its opened and closed positions, the inner surface of the handle member is adapted to provide bearing support for the second portion of the shaft.

6. A swell latch assembly according to claim 5, wherein the shaft comprises a substantially T-shaped member defining the generally elongated first portion substantially perpendicular to the second portion, with the second portion comprising a generally elongated member in engagement with the inner surface of the handle member over substantially the entire length thereof adapted for providing the pivotal engagement of the shaft and the handle member as the handle member is pivotally rotated between its opened and closed positions.

7. A swell latch assembly according to claim 5, wherein the generally elongated first portion of the shaft includes a first end distal the second portion of the shaft, with the first end of the generally elongated first portion of the shaft being inserted through the aperture of the handle member in a direction from the first side through to the second side on installation, with the second portion of the shaft engaging the inner surface of the handle member when the shaft is received therein for providing the pivotal engagement thereof, wherein the inner surface of the handle member defines a seating member adapted for retaining the second shaft portion on installation.

8. A swell latch assembly according to claim 5, wherein the shaft comprises the generally elongated first portion in connection with the second portion defining a substantially spherical member, with the substantially spherical member being in engagement exclusively with the inner surface of the handle member as the handle member is pivotally rotated between its opened and closed positions.

9. A swell latch assembly according to claim 8, wherein the substantially spherical second portion of the shaft is positioned offset in relation to the generally elongated first portion in order for maintaining the axial position of the shaft relative to the handle member.

10. A swell latch assembly according to claim 1, wherein the retaining member is integrally formed to the shaft providing a one-piece structure.

11. A swell latch assembly according to claim 1, wherein the shaft is adapted to be snap-fit with the handle member, with the shaft and handle member including chamfer means and cantilever means thereon for accommodating the snap-fit engagement thereof, wherein the cantilever means is adapted for receiving the chamfer means on installation, whereby the chamfer means is adapted to flex the cantilever means backwards as the shaft is being installed with the handle member, the cantilever means springing forward as the chamfer means is received therein for retaining the shaft and the handle member.

12. A swell latch assembly according to claim 11, wherein the shaft comprises a substantially T-shaped member defining a generally elongated first portion substantially perpendicular to a generally elongated second portion, wherein the generally elongated second portion includes a first end and a second end, with the chamfer means comprising at least one beveled edged disposed therein, the handle member including the cantilever means thereon adapted for engaging the chamfer means.

13. A swell latch assembly according to claim 1, wherein the retaining member is adjustably mounted on the shaft.

14. A swell latch assembly according to claim 1, wherein the shaft is integrally formed to the handle member providing a one-piece structure.

15. A swell latch assembly according to claim 14, wherein the connection between the shaft and the handle member provides a living hinge.

16. A swell latch assembly according to claim 1, further comprising housing means associated with the handle member and shaft adapted for being mounted within the aperture of the first member, the housing means including flange means thereon and an opening therein defining a cavity adapted for receiving the handle member in the closed position thereof, wherein the housing flange mean sand the handle member are both provided with substantially flat outer surfaces which are contiguous with each other when the handle member is in the closed position.

17. A latch assembly for mounting in an aperture formed in a first member adapted for releasably retaining the first member against a corresponding second member and in a latched position, the latch assembly comprising:
   a handle member adapted for pivotal rotation;
   a shaft comprising a unitary member pivotally engaging the handle member although not fixedly connected thereto, the shaft comprising a substantially T-shaped member defining a generally elongated first portion substantially perpendicular to a generally elongated second portion, with the generally elongated second portion being in pivotal engagement with the handle member, wherein the handle member is pivotally rotatable relative to the generally elongated second portion of the shaft, with the handle member being adapted to facilitate axial movement of the shaft by the pivotal engagement of the handle member and the generally elongated second portion of the shaft as the handle member is pivotally rotated between opened and closed positions;
   latching means associated with the shaft adapted for axial movement corresponding with movement of the shaft, the latching means being adapted for releasably retaining the second member in engagement with the first member in the closed position of the handle member;
   retaining means associated with the shaft adapted for securing the latching means in association with the shaft for releasably retaining the latched position of the latch assembly;
   wherein the handle member further includes an aperture extending therethrough from a first side through a second side and defining an inner surface therebetween adapted for receiving the shaft on installation, with the second portion of the shaft being adapted for engaging the inner surface of the handle member for both providing the pivotal engagement thereof and for retaining the shaft on installation, wherein as the handle member is pivotally rotated between its opened and closed positions, the inner surface of the handle member is adapted to provide bearing support for the second portion of the shaft; and
   wherein the second portion of the shaft is in engagement with the inner surface of the handle member over substantially the entire length thereof for providing the pivotal engagement of the shaft and the handle member, whereby the inner surface of the handle member provides bearing support for substantially the entire length of the second portion of the shaft.

18. A latch assembly according to claim 17, wherein the shaft and handle member further include containment means disposed therebetween adapted for retaining the shaft within the handle member upon installation for preventing possible disassembly thereof, wherein the containment means comprises at least a first shoulder member disposed on the shaft adapted for engaging a flexible tab member disposed within the handle member, with the flexible tab member being adapted to engage the first shoulder member of the shaft when the shaft is installed for retaining the shaft within the handle member, whereby the shaft is adapted to flex the flexible tab member forwards as the shaft is being installed in a first direction within the handle member, the flexible tab member springing backward to its original position when the shaft is received within the handle member, whereby when the shaft is installed, the shaft is not fixedly connected within the handle member, wherein the flexible tab member is adapted to engage the first shoulder of the shaft in response to predetermined movement of the shaft in a second direction within the handle member for preventing possible disassembly of the shaft and handle member when installed.

19. A latch assembly according to claim 18, wherein the containment means includes a second shoulder member disposed on the shaft adapted for engaging a substantially stepped section provided disposed within the handle member.

20. A latch assembly according to claim 19, wherein the substantially T-shaped member of the shaft is bilaterally symmetrical about a plane defined by a central axis of rotation of both the generally elongated first and second portions thereof, whereby the shaft is receivable within the handle member in two positions defined by the bilaterally symmetrical portions thereof, wherein the first and second shoulder members are positioned generally diametrically opposing on the shaft, with the flexible tab member and the substantially stepped section of the handle member being provided corresponding to the position of the first and second shaft shoulder members.

21. A latch assembly according to claim 17, wherein the retaining means is adjustably mounted on the shaft and positioned in order for securing the latching mean sin a position thereon so as to urge the second portion of the shaft axially downward for maintaining engagement with the inner surface of the handle member as it is rotated between its opened and closed positions.

22. A latch assembly according to claim 17, further comprising housing means associated with the handle member and shaft adapted for being mounted within the aperture of the first member, the housing means including flange means thereon and an opening therein defining a cavity adapted for receiving the handle member in the closed position thereof, wherein the housing flange means and the handle member are both provided with substantially flat outer surfaces which are contiguous with each other when the handle member is in the closed position.

23. A latch assembly according to claim 17, wherein the latching means as it is moved axially corresponding with the axial movements of the shaft as the handle member is pivotally rotated between its opened and closed positions is adapted to urge the generally elongated second portion of the shaft axially downward for maintaining engagement with the inner surface of the handle member so as to retain the shaft in pivotal engagement therewith.

24. A latch assembly according to claim 17, wherein the generally elongated first portion of the shaft includes a first end and a second end, with the second end being in connection with the generally elongated second portion, wherein the first end of the generally elongated first portion of the shaft is inserted through the aperture of the handle member in a direction from the first side through to the second side on installation, with the generally elongated second portion of the shaft being adapted to engage the inner surface of the handle member when the shaft is received therein for providing the pivotal engagement thereof, wherein the inner surface of the handle member defines a seating member adapted for retaining the generally elongated second shaft portion on installation.

25. A latch assembly according to claim 17, wherein the generally elongated second portion of the shaft includes a first end and a second end, with the pivotal engagement of the handle member and the generally elongated second portion of the shaft being independent of the first and second ends thereof.

26. A latch assembly according to claim 17, wherein the generally elongated second portion of the shaft comprises a substantially spherical member.

27. A latch assembly according to claim 26, wherein the first side of the handle member is substantially planar over the entire length thereof and the substantially spherical second portion of the shaft distal the connection with the generally elongated first portion of the shaft is provided with a substantially planar outer surface, whereby the substantially planar first side of the handle member and the substantially planar outer surface of the substantially spherical second portion of the shaft are contiguous with each other when the handle member is in the closed position.

28. A latch assembly according to claim 26, wherein the substantially spherical second portion of the shaft as the handle member is pivotally rotated between its opened and closed positions is in engagement exclusively with the inner surface of the handle member for providing the pivotal relation between the shaft and the handle member.

29. A latch assembly according to claim 26, wherein the substantially spherical second portion of the shaft is positioned offset in relation to the generally elongated first portion in order for maintaining the axial position of the shaft relative to the handle member.

30. A latch assembly for mounting in an aperture formed in a first member adapted for releasably retaining the first member against a corresponding second member and in a latched position, the latch assembly comprising:

a handle member adapted for pivotal rotation;

a shaft comprising a unitary member adapted for being snap-fit with the handle member, wherein the shaft and the handle member include a chamfered member and cantilever member thereon adapted for accommodating the snap-fit engagement thereof, with the cantilever member being adapted for receiving the chamfered member on installation, whereby the chamfered member is adapted to flex the cantilever member backwards as the shaft is being installed with the handle member, the cantilever member springing forward as the chamfered member is received therein for retaining the shaft and the handle member, the handle member being adapted to facilitate axial movement of the shaft as the handle member is pivotally rotated by the snap-fit engagement with the shaft between opened and closed positions;

latching means associated with the shaft adapted for axial movement corresponding with movement of the shaft, the latching means being adapted for releasably retaining the second member in engagement with the first member in the closed position of the handle member; and retaining means associated with the shaft adapted for securing the latching means in association with the shaft for releasably retaining the latched position of the latch assembly.

31. A latch assembly according to claim 30, wherein the shaft comprises a substantially T-shaped member defining a generally elongated first portion substantially perpendicular to a generally elongated second portion, wherein the generally elongated second portion includes a first end and a second end, with the chamfered member comprising at least one beveled edged disposed thereon, the handle member including the cantilever member thereon adapted for engaging the chamfered member.

32. A latch assembly according to claim 30, wherein the retaining means is integrally formed to the shaft providing a one-piece structure.

33. A latch assembly according to claim 30, wherein the retaining means is adjustably mounted on the shaft.

34. A latch assembly according to claim 30, further comprising housing means associated with the handle member and shaft adapted for being mounted within the aperture of the first member, the housing means including flange means thereon and an opening therein defining a cavity adapted for receiving the handle member in the closed position thereof, wherein the housing flange means and the handle member are both provided with substantially flat outer surfaces which are contiguous with each other when the handle member is in the closed position.

35. A latch assembly for mounting in an aperture formed in a first member adapted for releasably retaining the first member against a corresponding second member and in a latched position, the latch assembly comprising:

a handle member adapted for pivotal rotation;

a shaft comprising a unitary member integrally formed to the handle member, wherein the handle member and shaft comprise a one-piece structure, the handle member being adapted to facilitate axial movement of the shaft as the handle member is pivotally rotated between opened and closed positions;

latching means associated with the shaft adapted for axial movement corresponding with movement of the shaft, the latching means being adapted for releasably retaining the second member in engagement with the first member in the closed position of the handle member; and retaining means associated with the shaft adapted for securing the latching means in association with the shaft for releasably retaining the latched position of the latch assembly.

36. A latch assembly according to claim 35, wherein the retaining means is integrally formed to the shaft providing a one-piece structure.

37. A latch assembly according to claim 35, wherein the retaining means is adjustably mounted on the shaft.

38. A latch assembly according to claim 35, further comprising housing means associated with the handle member and shaft adapted for being mounted within the aperture of the first member, the housing means including flange means thereon and an opening therein defining a cavity adapted for receiving the handle member in the closed position thereof, wherein the housing flange means and the handle member are both provided with substantially flat outer surfaces which are contiguous with each other when the handle member is in the closed position.

39. A latch assembly according to claim 35, wherein the connection between the shaft and the handle member provides a living hinge.

* * * * *

UNITED STATES PATENT AND TRADEMARK OFFICE
CERTIFICATE OF CORRECTION

PATENT NO. : 5,368,347
DATED : November 29, 1994
INVENTOR(S) : Holtman et al.

It is certified that error appears in the above-indentified patent and that said Letters Patent is hereby corrected as shown below:

Col. 1, line 36, after the words "A riveted on washer" insted should be -- instead --.

Col. 3, line 39, after the words "shaft means 14 comprises a" one-pie should be -- one-piece --.

Col. 6, line 53, after the words "the portions which" axle should be -- are --.

Col. 8, line 57, Claim 1 after the words "connection therebetween" insert -- , --.

Col. 9, line 5, after the words "retaining member" nd should be -- and --.

Col. 10, line 8, Claim 5 after the words "and defining" n should be -- an --.

Col. 11, line 10, Claim 12 after the words "after edged disposed" therein should be -- thereon --.

UNITED STATES PATENT AND TRADEMARK OFFICE
CERTIFICATE OF CORRECTION

PATENT NO. : 5,368,347
DATED : November 29, 1994
INVENTOR(S) : Holtman et al.

It is certified that error appears in the above-indentified patent and that said Letters Patent is hereby corrected as shown below:

Column 11, line 29, Claim 16, after the words "housing flange" mean sand should be —means and—.

Signed and Sealed this

Nineteenth Day of September, 1995

Attest:

BRUCE LEHMAN

Attesting Officer

Commissioner of Patents and Trademarks